US008933671B2

(12) United States Patent
Lee et al.

(10) Patent No.: US 8,933,671 B2
(45) Date of Patent: Jan. 13, 2015

(54) SYSTEM AND METHOD FOR ALLOCATING IDENTIFIER TO MULTI-BMS

(71) Applicant: LG Chem, Ltd., Seoul (KR)

(72) Inventors: Hyun-Chul Lee, Daejeon (KR); Jong-Min Park, Daejeon (KR); Yeong-Ju Kang, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 14/095,004

(22) Filed: Dec. 3, 2013

(65) Prior Publication Data

US 2014/0091770 A1    Apr. 3, 2014

Related U.S. Application Data

(63) Continuation of application No. PCT/KR2013/001334, filed on Feb. 20, 2013.

(30) Foreign Application Priority Data

Feb. 20, 2012    (KR) ........................ 10-2012-0016829

(51) Int. Cl.
*H01M 10/44*    (2006.01)
*H01M 10/46*    (2006.01)
(Continued)

(52) U.S. Cl.
CPC ................. *H02J 7/0068* (2013.01); *H02J 7/04* (2013.01); *H04Q 9/00* (2013.01); *H01M 10/441* (2013.01); *H04Q 2209/10* (2013.01); *H04Q 2209/30* (2013.01)
USPC ........................................................ 320/135

(58) Field of Classification Search
USPC .......... 320/107, 112, 116, 132, 134, 135, 136
See application file for complete search history.

(56) References Cited

U.S. PATENT DOCUMENTS 8,307,223 B2    11/2012 Tae et al.
2002/0032876 A1*    3/2002 Okagaki et al. ............... 713/300
(Continued)

FOREIGN PATENT DOCUMENTS

KR    10-2007-0095612 A    10/2007
KR    10-2010-0024708 A    3/2010
(Continued)

OTHER PUBLICATIONS

International Search Report issued in PCT/KR2013/001334, mailed on May 30, 2013.

(Continued)

*Primary Examiner* — Edward Tso
(74) *Attorney, Agent, or Firm* — Birch, Stewart, Kolasch & Birch, LLP (57) ABSTRACT

Disclosed is a multi-BMS identifier allocation system. The multi-BMS identifier allocation system according to the present invention comprises a master BMS and N slave BMSs (N is an integer greater than or equal to 2) which are connected to a series communication network and a parallel communication network, wherein the master BMS comprises at least two first and second master communication channels which form a communication interface with the series communication network and selectively output a forward or backward enabling signal and allocates unique communication identifiers to the slave BMSs through the parallel communication network, and the first to Nth slave BMSs start enabling in response to the forward or backward enabling signal received through the series communication network, are allocated the identifiers from the master BMS through the parallel communication network, and output an enabling signal to an adjacent slave BMS along a transmission direction of the enabling signal.

26 Claims, 8 Drawing Sheets

(51) Int. Cl.
*H02J 7/00* (2006.01)
*H02J 7/04* (2006.01)
*H04Q 9/00* (2006.01)

(56) References Cited

U.S. PATENT DOCUMENTS

2010/0055543 A1 3/2010 Tae et al.
2011/0175574 A1 7/2011 Sim et al.
2014/0210420 A1* 7/2014 Lee et al. ................ 320/134

FOREIGN PATENT DOCUMENTS

| KR | 10-2010-0097504 A | 9/2010 |
| KR | 10-2011-0013747 A | 2/2011 |
| KR | 10-1016813 B1 | 2/2011 |

OTHER PUBLICATIONS

Written Opinion issued in PCT/KR2013/001334, mailed on May 30, 2013.

* cited by examiner

SYSTEM AND METHOD FOR ALLOCATING IDENTIFIER TO MULTI-BMS

CROSS-REFERENCE TO RELATED APPLICATION

The present application is a continuation of International Application No. PCT/KR2013/001334 filed on Feb. 20, 2013, which claims priority to Korean Patent Application No. 10-2012-0016829 filed in the Republic of Korea on Feb. 20, 2012, the disclosures of which are incorporated herein by reference.

TECHNICAL FIELD

The present disclosure relates to a system and method for allocating an identifier to each battery management system (BMS) of a battery pack having a multi-BMS structure, and more particularly, to a system and method for allocating an identifier to all slave BMSs even though an error occurs in a serial communication network.

BACKGROUND ART

Due to its characteristics of being easily applicable to various products and electrical characteristics such as a high energy density, a secondary battery is not only commonly applied to a portable equipment, but universally applied to an electric vehicle (EV), a hybrid vehicle (HV), or an energy storage system that is propelled by an electric motor. This secondary battery is gaining attention for its primary advantage of remarkably reducing the use of fossil fuels and not generating by-products from the use of energy, making it a new eco-friendly and energy efficient source of energy.

A battery pack for use in electric vehicles has a structure of a plurality of cell assemblies including a plurality of unit cells are connected in series to ensure a high output. Also, the unit cell can be charged and discharged repeatedly by an electrochemical reaction between elements including a cathode current collector, an anode current collector, a separator, an active material, an electrolyte solution, and the like.

In addition to this basic structure, the battery pack further includes a battery management system (BMS) to monitor and control a state of a secondary battery by applying an algorithm for control of power supply to a driving load such as a motor or the like, measurement values of electrical characteristics such as current, voltage, and the like, charge/discharge control, voltage equalization control, state of charge (SOC) estimation, and the like.

Recently, with the increasing need for a high-capacity structure as well as utilization as an energy storage source, the demand for a battery pack of a multi-module structure in which a plurality of battery modules including a plurality of batteries connected in series and/or in parallel are assembled, is also increasing.

Because the battery pack of the multi-module structure includes a plurality of batteries, there is a limitation in controlling the charge/discharge state of all the batteries using a single BMS. Accordingly, a recent technology has been introduced in which a BMS is provided to each battery module included in the battery pack, designates any one of the BMS as a master BMS and the remaining BMSs as a slave BMS, and controls the charge and discharge of each battery module in a master-slave mode.

The slave BMS stands by in a sleep mode during a normal state, wakes up by a wake-up signal from the master BMS, and is allocated with an identifier from the slave BMS.

Although the wake-up signal can be transmitted through various communication networks, generally, a serial communication network is mainly used. The serial communication network has advantages of easily implementing a communication configuration, having excellent signal transmission characteristics, and allowing an existing communication line to be used, leading to significant reduction in costs.

The serial communication network has a connection scheme in which a receiver receiving a signal becomes a transmitter and relays the signal to an adjacent receiver connected to the receiver. Accordingly, when an error or a disconnection occurs in a certain section of the serial communication network, signal transmission fails from the faulty communication section.

Accordingly, in a case of a battery pack including a plurality of slave BMSs connected through a serial communication network, when an error or a disconnection occurs in a certain section of the communication network, some slave BMSs do not wake up and cannot be allocated with an identifier. Particularly, the closer the faulty section of the communication network is to a master BMS, the greater the number of slave BMSs that do not wake up increases. In this case, the master BMS cannot communicate with a slave BMS having no allocated identifier, and thus, cannot recognize the charge/discharge state of a battery cell or a battery module included in the slave BMS having no allocated identifier. As a result, a total capacity of the battery pack may be reduced, or further, the use of the entire battery pack may be stopped.

DISCLOSURE

Technical Problem

The present disclosure is designed to solve the problems of the related art, and therefore, the present disclosure is directed to providing a system and method for allocating an identifier to a multi-BMS even in a state that an error occurs in a certain communication section of a series communication network.

Technical Solution

To solve the technical problem, the present disclosure provides a system for allocating an identifier to a multi-battery management system (BMS) that allocates a unique communication identifier to a multi-BMS of a battery pack, the system comprising a master BMS and N slave BMSs (N is an integer greater than or equal to 2) connected to a serial communication network and a parallel communication network, wherein the master BMS includes at least two first and second master communication channels that form a communication interface with the serial communication network and selectively output a forward or backward wake-up signal, and allocates a unique communication identifier to the slave BMS through the parallel communication network, and the first through $N^{th}$ slave BMSs wake up in response to the forward or backward wake-up signal received through the series communication network, are allocated with the identifier from the master BMS through the parallel communication network, and output the wake-up signal to the adjacent slave BMS along the transmission direction of the wake-up signal.

Preferably, the master BMS and the N slave BMSs are connected in a ring structure through the serial communication network.

Preferably, the master BMS outputs a forward wake-up signal through the first master communication channel and a backward wake-up signal through the second master communication channel. For this, the master BMS may include a master control unit to control the output of the forward or backward wake-up signal.

Preferably, the slave BMS includes at least two slave communication channels forming a communication interface with the serial communication network.

Preferably, the slave BMS includes a slave control unit to sense the forward or backward wake-up signal being received through the serial communication network and control the wake up of the BMS, and to control the output of an identifier allocation request signal to the master BMS through the parallel communication network.

Preferably, the slave control unit includes a masking setting logic to perform masking setting to prevent a unique communication identifier from being further allocated after the unique communication identifier is allocated from the master BMS.

Preferably, the slave control unit includes a wake-up signal transmission logic to control the transmission operation of the wake-up signal to the adjacent slave BMS along the transmission direction of the forward or backward wake-up signal through the serial communication network after the unique communication identifier is allocated from the master BMS.

Preferably, the master control unit includes a capacity check control logic to check a number of the slave BMSs allocated with the unique communication identifiers and a charge/discharge capacity of the battery pack using data on a number of the unique communication identifiers allocated to the slave BMSs.

Preferably, the master control unit includes an error determination control logic to determine that an error occurs in the serial communication network when the wake-up signal is not received within a preset period of time through the second master communication channel after the forward wake-up signal is outputted through the first master communication channel. The master control unit outputs a backward wake-up signal through the second master communication channel when an error is determined to occur in the serial communication network.

In an aspect of the present disclosure, the parallel communication network is a controller area network (CAN) communication network.

In another aspect of the present disclosure, the serial communication network is a daisy chain.

The master BMS of the system for allocating an identifier to a multi-BMS according to the present disclosure may include a plurality of pairs of first and second master communication channels to output a wake-up signal. In this instance, the first through $N^{th}$ slave BMSs may be connected in a ring structure to each pair of the master communication channels through the serial communication network.

The system for allocating an identifier to a multi-BMS according to the present disclosure may be included in a battery pack.

Also, the system for allocating an identifier to a multi-BMS according to the present disclosure may be an element or component of a battery-powered system comprising a battery pack and a load supplied with power from the battery pack. Preferably, the load is an electric motor means or a portable equipment.

Also, the system for allocating an identifier to a multi-BMS according to the present disclosure may be an element or component of an energy storage system comprising a plurality of battery packs.

To solve the technical problem, the present disclosure also provides a method of allocating an identifier to a multi-BMS that allocates a unique communication identifier to a multi-BMS of a battery pack in which a master BMS and N slave BMSs (N is an integer greater than or equal to 2) are connected through a serial communication network and a parallel communication network, and the master BMS includes first and second master communication channels to selectively output a forward or backward wake-up signal through the serial communication network, the method comprising (a) selecting, by the master BMS, any one of the first master communication channel and the second master communication channel based on a normal mode and an error mode, and outputting a wake-up signal through the series communication network in a direction corresponding to the selected communication channel; and (b) the slave BMS waking up in response to the forward or backward wake-up signal, receiving a unique communication identifier allocated from the master BMS through the parallel communication network, and outputting the wake-up signal to the adjacent slave BMS through the serial communication network along the transmission direction of the forward or backward wake-up signal.

Advantageous Effects

According to an aspect of the present disclosure, when an error occurs in a certain section of a serial communication network, this may be automatically detected, and by diversifying a transmission direction of a wake-up signal, all slave BMSs may wake up and be allocated with each identifier. Accordingly, a conventional problem of being incapable of allocating an identifier to a BMS connected after a faulty section of a serial communication network may be solved.

According to another aspect of the present disclosure, even in a case in which an error occurs in a certain section of a serial communication network, the need to remove or replace the faulty section of the communication network and a slave BMS corresponding to the faulty section may be eliminated, resulting in ease of maintenance and repair of a battery system and reduction in maintenance and repair costs.

According to still another aspect of the present disclosure, an identifier may be allocated to a multi-BMS in a sequential order by allowing for the use of both a parallel communication network and a serial communication network, thereby preventing a possible overlap between identifiers. Accordingly, even though a certain BMS among the multi-BMS is replaced by a new one or a new BMS allocated with an identifier is provided, operation without any overlap between identifiers may be implemented, thereby enhancing expansion or adaptation in installation for a BMS and improving reliability of a battery pack.

According to yet another aspect of the present disclosure, there is an advantage of being free to arrange a master BMS and a slave BMS when implementing a battery pack since the master BMS does not need to be placed at a foremost or backmost end of a serial communication network.

DESCRIPTION OF DRAWINGS

Other objects and aspects of the present disclosure will become apparent from the following descriptions of the embodiments with reference to the accompanying drawings in which.

MODE FOR DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

Figure 1:
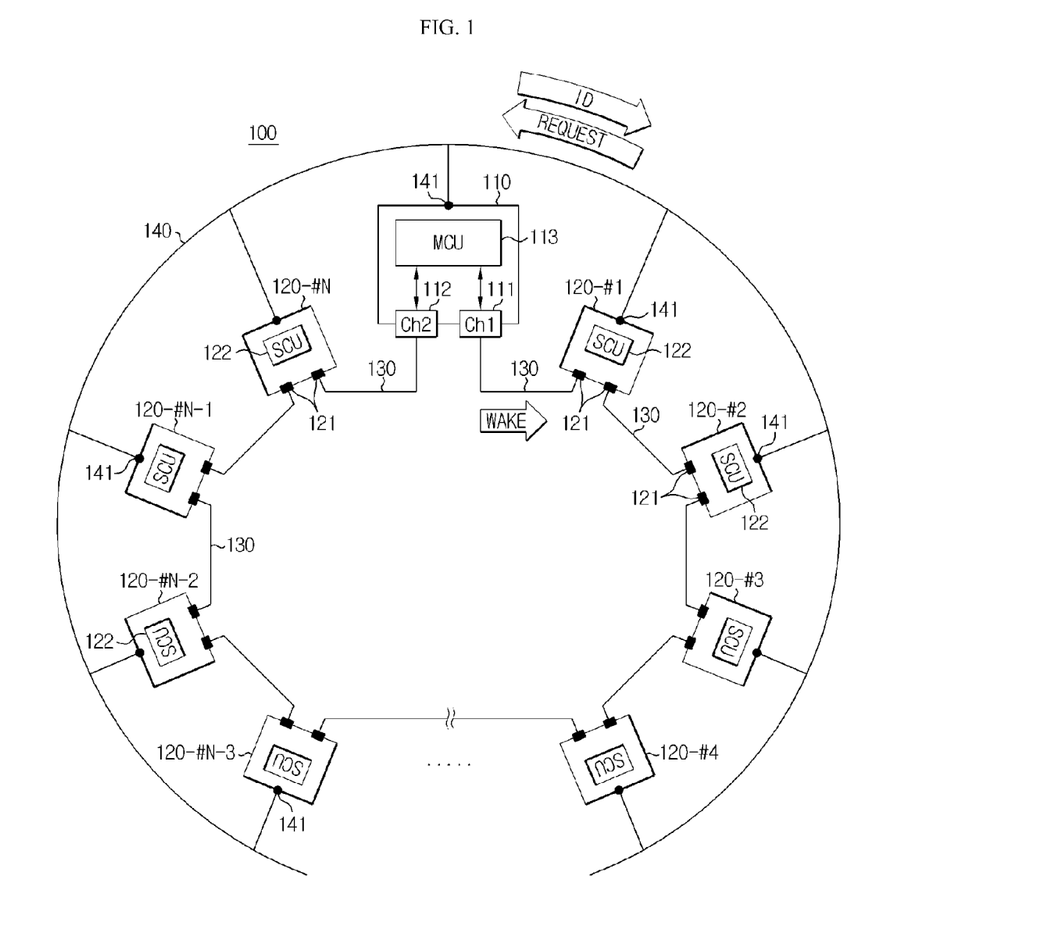
FIG. 1 is a schematic block diagram illustrating a configuration of a system for allocating an identifier to a multi-BMS according to an exemplary embodiment.

FIG. 1 is a schematic block diagram illustrating a configuration of a system 100 for allocating an identifier to a multi-BMS according to an exemplary embodiment.

Referring to FIG. 1, the system 100 for allocating an identifier to a multi-BMS includes a master BMS 110 and N slave BMSs 120 (N is an integer greater than or equal to 2). The master BMS 110 and the N slave BMSs 120 are connected through a serial communication network 130 and a parallel communication network 140.

The serial communication network 130 is used to relay a wake-up signal from one BMS to another among adjacent BMSs. The parallel communication network 140 is used to transmit and receive information for allocating a unique communication identifier between the master BMS 110 and the slave BMS 120.

In this instance, the serial communication network 130 may be a daisy chain. The daisy chain refers to a bus wiring scheme in which multiple devices are wired together in sequence. Dissimilar to a simple bus connection, the daisy chain supports a signal transmission scheme that allows relaying of a signal from one device to another within a chain. All the daisy-chained devices can transmit an identical signal, but a device receiving the signal may not transmit the signal to another device or may transmit the signal after modulating the signal.

Also, the parallel communication network 140 may be a controller area network (CAN) communication network. Since the CAN communication network is well known in the art, its detailed description is omitted herein.

Preferably, the master BMS 110 and the N slave BMSs 120 are connected in a ring structure through the serial communication network 130. The ring communication network has a connection structure in which each node connects to two neighboring nodes, forming a continuous network of a ring layout as a whole.

The master BMS 110 includes at least two master communication channels, here, a first master communication channel 111 and a second master communication channel 112, forming a communication interface with the serial communication network 130. Although FIG. 1 shows that a communication channel located at a right side is set as the first master communication channel 111, the present disclosure is not limited to the illustrated example. Also, it is not intended to represent that the first master communication channel 111 has a priority to the second master communication channel 112. That is, it should be understood that the designation of the first master communication channel 111 and the second master communication channel 112 is only for distinguishing two master communication channels.

Also, the master BMS 110 may include a parallel communication channel 141 forming a communication interface with the parallel communication network 140. The parallel communication channel 141 is used to transmit and receive data for allocating a unique communication identifier between the master BMS 110 and the slave BMS 120 through the parallel communication network 140.

The master BMS 110 outputs a forward wake-up signal through the first master communication channel 111, and selectively outputs a backward wake-up signal through the second master communication channel 112. In the example of FIG. 1, a wake-up signal outputted from the first master communication channel 111 and transmitted in a clockwise direction is set as a forward wake-up signal. However, this is a relative concept for distinguishing wake-up signals outputted from the first master communication channel 111 and the second master communication channel 112. Accordingly, there is no limitation in setting a wake-up signal outputted from the second master communication channel 112 as a forward wake-up signal.

Preferably, the master BMS 110 includes a master control unit 113 to control the output of the forward or backward wake-up signal.

The slave BMS 120 includes at least two slave communication channels 121 forming a communication interface with the serial communication network 130. Also, the slave BMS 120 includes a parallel communication channel 141 forming a communication interface with the parallel communication network 140.

When the first slave BMS 120-#1 receives the forward wake-up signal outputted from the master BMS 110, the first slave BMS 120-#1 wakes up. The wake-up signal is a signal enabling wake up of the slave BMS 120 from a sleep mode.

In the example of FIG. 1, the first slave BMS 120-#1 is a slave BMS that receives the forward wake-up signal first. In the present disclosure, the designation of the first to $N^{th}$ slave BMSs 120-#1 to 120-#N is just for distinguishing a plurality of slave BMSs based on a connected location. Accordingly, in a case in which a wake-up signal in a counterclockwise direction is outputted through the second master communication channel 112, the $N^{th}$ slave BMS 120-#N may be designated as a first slave BMS.

When the first slave BMS 120-#1 wakes up, the first slave BMS 120-#1 transmits an identifier allocation request signal to the master BMS 110 through the parallel communication network 140. The identifier allocation request signal is a signal notifying that the slave BMS 120 is ready to be allocated with a unique communication identifier to the master BMS 110.

When the master BMS 110 receives the identifier allocation request signal, the master BMS 110 transmits a unique communication identifier to the first slave BMS 120-#1 through the parallel communication network 140. The first slave BMS 120-#1 receives and stores the unique communication identifier, and setting of the unique communication identifier is completed. Henceforward, when the first slave BMS 120-#1 communicates with the master BMS 110 through the parallel communication network 140, the first slave BMS 120-#1 transmits and receives data using the set unique communication identifier.

Preferably, the slave BMS 120 includes a slave control unit 122 to control the wake up of the BMS by sensing the forward or backward wake-up signal received through the serial communication network 130 and to control the output of the identifier allocation request signal to the master BMS 110 through the parallel communication network 140.

The slave control unit 122 includes a wake-up signal transmission logic to control an operation of receiving the unique communication identifier allocated from the master BMS 110 and transmitting the wake-up signal to the adjacent slave BMS 120 through the serial communication network 130 along the transmission direction of the forward or backward wake-up signal. Accordingly, the first slave BMS 120-#1 outputs the wake-up signal to the second slave BMS 120-#2 through the serial communication network 140.

Figure 2:
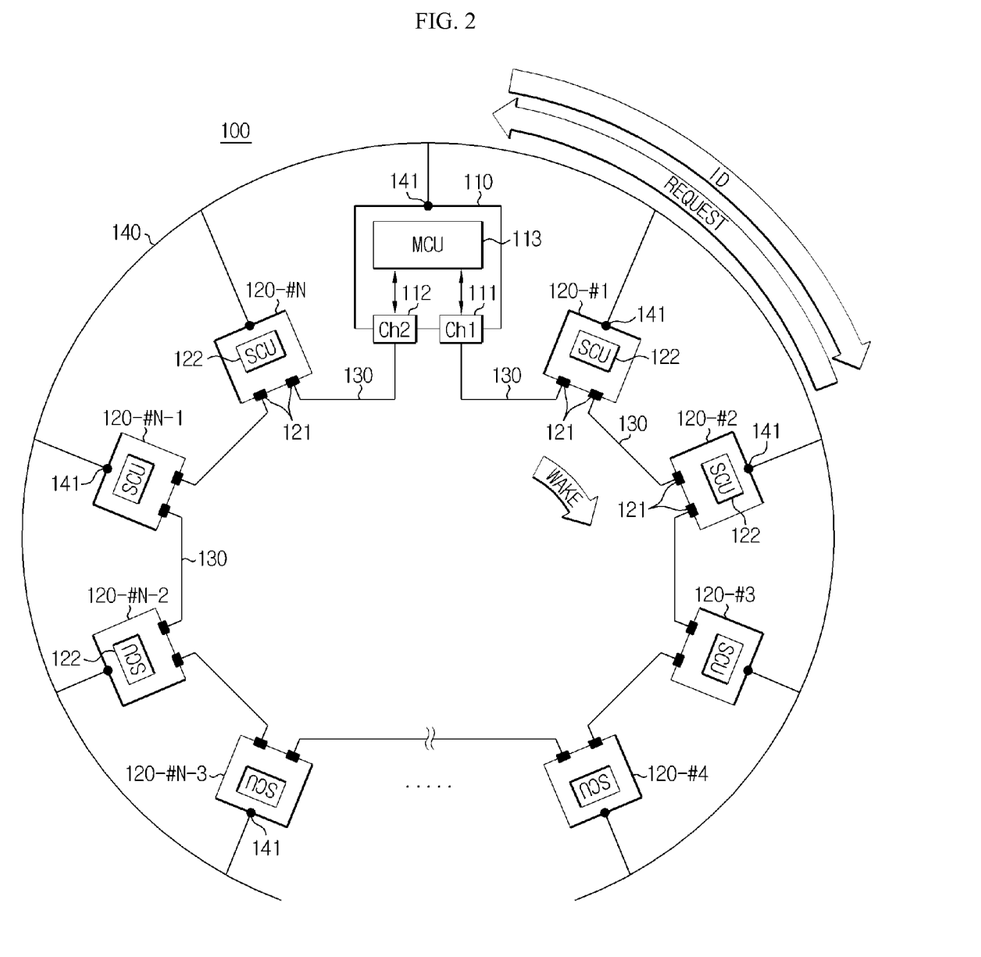
FIG. 2 is a schematic diagram illustrating a procedure in which a second slave BMS is allocated with a unique communication identifier.

FIG. 2 is a schematic diagram illustrating a procedure in which the second slave BMS 120-#2 is allocated with the unique communication identifier.

Referring to FIG. 2, the second slave BMS 120-#2 receives the wake-up signal from the first slave BMS 120-#1 through the serial communication network 130. The second slave BMS 120-#2 wakes up in response to the wake-up signal and outputs an identifier allocation request signal to the master BMS 110 through the parallel communication network 140.

Similarly, the master BMS 110 receiving the identifier allocation request signal transmits a unique communication identifier to the second slave BMS 120-#2 through the parallel communication network 140. The second slave BMS 120-#2 receives and stores the unique communication identifier, and setting of the unique communication identifier is completed.

In this way, a $k^{th}$ slave BMS (k is an integer) is allocated with a unique communication identifier by communicating with the master BMS 110 in the same manner as the first slave BMS 120-#1, and stores the unique communication identifier. Also, the $k^{th}$ slave BMS outputs a wake-up signal to an adjacent $k+1^{th}$ slave BMS. As the wakeup and identifier allocation operations of the BMS are repeated by the relay transmission of the wake-up signal, a process of allocating the unique communication identifier to the slave BMSs 120 is performed in a sequential order and completed.

Meanwhile, the master BMS 110 may allocate a unique communication identifier to each slave BMS 120 using various methods to prevent an overlap between unique communication identifiers. For example, the overlap may be prevented by associating a unique communication identifier with a wake-up order of each slave BMS 120. That is, the master BMS 110 recognizes the wake-up order of each BMS based on a point in time at which the identifier allocation request signal is received through the parallel communication network 140. Next, the master BMS 110 allocates the unique communication identifier consisting of data decreasing or increasing sequentially in the recognized wake-up order to the slave BMS 120 through the parallel communication network 140. Accordingly, there is no possibility that the unique communication identifiers of the slave BMSs 120 will overlap. This identifier allocation control logic may be included in the master control unit 113.

Also, the master BMS 110 may implement various embodiments for preventing an overlap between unique communication identifiers, for example, unique communication identifier allocation by a pre-stored database, and the present disclosure is not limited to the exemplary embodiments.

Preferably, the slave control unit 122 includes a masking setting logic to perform a masking setting to prevent a unique communication identifier from being further allocated after the unique communication identifier is allocated from the master BMS 110.

According to characteristics of the parallel communication network 140, the slave BMSs 120 connected to the parallel communication network 140 may receive all data signals related to the unique communication identifier allocation from the master BMS 110. A slave BMS that has not yet received the wake-up signal does not respond to the data signal related to unique communication identifier allocation received through the parallel communication network 140. However, a previously awakened slave BMS may receive the data signal related to the unique communication identifier allocation when another slave BMS receives the data signal from the master BMS. In this instance, the previously awakened slave BMS may mistake the unique communication identifier for another slave BMS as its own. In this case, the slave BMS already allocated to a unique communication identifier may be allocated again with another unique communication identifier for another slave BMS, resulting in an overlapping of at least two slave BMSs allocated with an identical unique communication identifier.

Accordingly, to solve the overlapping issue between unique communication identifiers, the slave control unit 122 of the slave BMS allocated with the unique communication identifier performs a masking setting to prevent the corresponding slave BMS from mistaking the data signal related to a unique communication identifier allocation transmitted to and received from the master BMS 110 through the parallel communication network 140.

Meanwhile, when the $N^{th}$ slave BMS 120-#N or the last slave BMS receives the forward wake-up signal and is allocated with a unique communication identifier, the $N^{th}$ slave BMS 120-#N outputs the wake-up signal to the master BMS 110. When the master BMS 110 receives the forward wake-up signal through the second master communication channel 112, the master BMS 110 determines that the serial communication network 130 is all connected without an error or disconnection and all the slave BMSs 120 are awakened and allocated with unique communication identifiers.

Similarly, in a case in which the master BMS 110 outputs a backward wake-up signal through the second master communication channel 112, when the master BMS 110 receives the backward wake-up signal through the first master communication channel 111, the master BMS 110 determines that the serial communication network 130 is all connected without an error or disconnection and all the slave BMSs 120 are awakened and allocated with unique communication identifiers.

Preferably, the master control unit 113 includes a capacity check control logic to check a number of the slave BMSs 120 allocated with the unique communication identifiers and a charge/discharge capacity of the battery pack using data on a number of unique communication identifiers allocated to the slave BMSs 120.

Preferably, the master control unit 113 includes an error determination control logic to determine that an error occurs in the serial communication network 130 when the forward wake-up signal is not received through the second master communication channel 112 within a preset period of time after outputting the forward wake-up signal through the first master communication channel 111.

Figure 3:
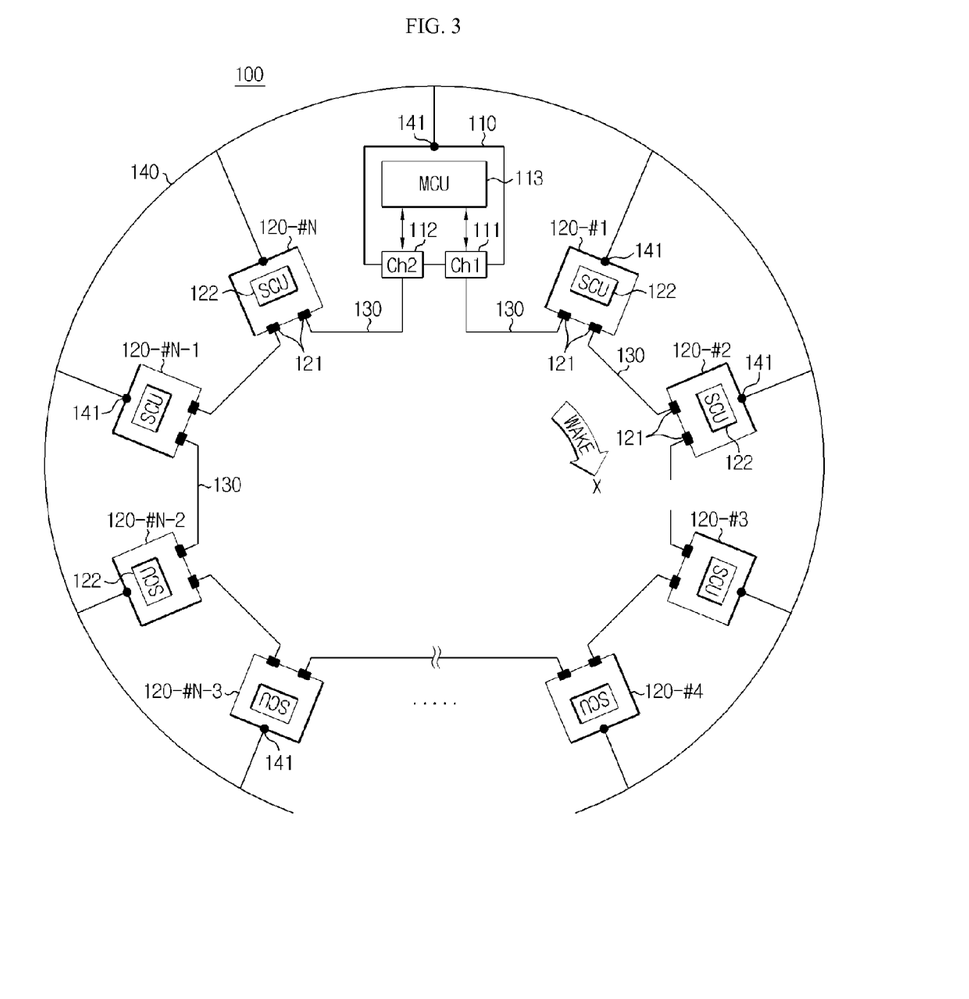
FIG. 3 is a schematic diagram illustrating an example in which an error occurs in a serial communication network of a system for allocating an identifier to a multi-BMS according to an exemplary embodiment.

FIG. 3 is a schematic diagram illustrating an example in which an error occurs in the serial communication network 130 of the system 100 for allocating an identifier to a multi-BMS according to an exemplary embodiment.

Referring to FIG. 3, illustrated is a situation in which an error occurs due to disconnection of the serial communication network 130 connecting the second slave BMS 120-#2 and the third slave BMS 120-#3. Accordingly, a problem occurs in which among the N slave BMSs, only the first slave BMS 120-#1 and the second slave BMS 120-#2 can wake up and the remaining slave BMSs 120-#3 through 120-#N cannot wake up.

In this situation, after the master control unit 113 outputs the forward wake-up signal through the first master communication channel 111, the master control unit 113 determines whether the wake-up signal is received through the second master communication channel 112 within the preset period of time using the error determination control logic. However, because the serial communication network 130 connecting the second slave BMS 120-#2 and the third slave BMS 120-#3 is disconnected, the wake-up signal is not received through the second master communication network 130 within the preset period of time. Accordingly, the master control unit 113 determines that an error occurs in the serial communication network 130.

Here, the waiting period during which the master control unit 113 waits for the wake-up signal to be received may be variously set. For example, the waiting period may be set based on a time spent in transmitting the wake-up signal between the adjacent slave BMSs 120, a communication speed of the serial communication network 130 and the parallel communication network 140, an allocation speed of the unique communication identifier for each slave BMS 120, and the like.

Figure 4:
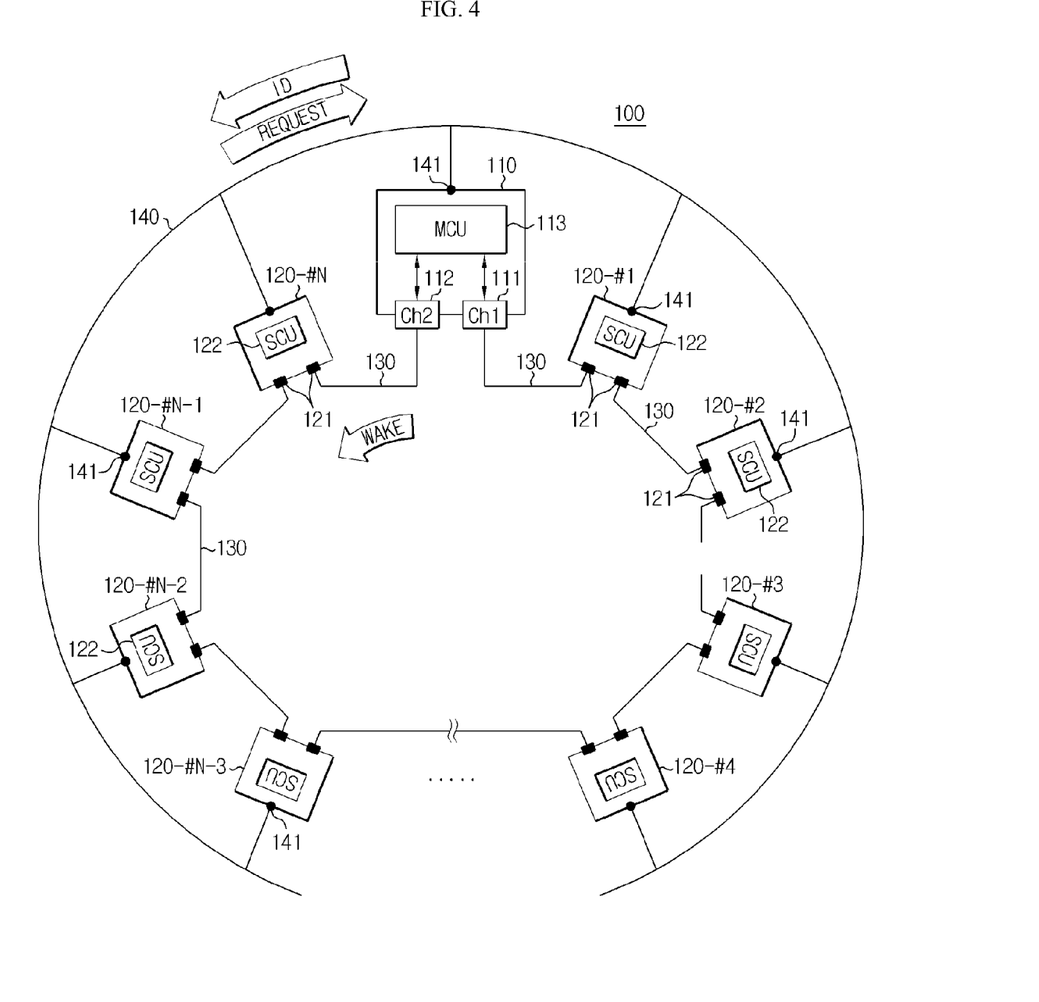
FIG. 4 is a schematic diagram illustrating an example in which a master BMS responds to an error occurring in a serial communication network of a system for allocating an identifier to a multi-BMS according to an exemplary embodiment.

FIG. 4 is a schematic diagram illustrating an example in which the master BMS 110 responds to an error occurring in the serial communication network 130 of the system 100 for allocating an identifier to a multi-BMS according to an exemplary embodiment.

Referring to FIG. 4, when the master control unit 113 determines that an error occurs in the serial communication network 130, the master control unit 113 outputs a backward wake-up signal to the master BMS 110 through the second master communication channel 112.

When the $N^{th}$ slave BMS 120-#N receives the backward wake-up signal from the master BMS 110, the $N^{th}$ slave BMS 120-#N wakes up and outputs an identifier allocation request signal to the master BMS 110 through the parallel communication network 140.

In the same manner as the first slave BMS 120-#2, when the master BMS 110 receives the identifier allocation request signal, the master BMS 110 transmits a unique communication identifier to the $N^{th}$ slave BMS 120-#N through the parallel communication network 140. The $N^{th}$ slave BMS 120-#N receives and stores the unique communication identifier, and setting of the unique communication identifier is completed.

Also, the $N^{th}$ slave BMS 120-#N outputs the wake-up signal to the adjacent N-$1^{th}$ slave BMS 120-#N-1 along a direction in which the backward wake-up signal is received. In this instance, it is found that this is substantially the same as the output of the wake-up signal from the first slave BMS 120-#1 to the adjacent second slave BMS 120-#2 in accordance with the forward wake-up signal, except for a transmission direction of the signal.

Figure 5:
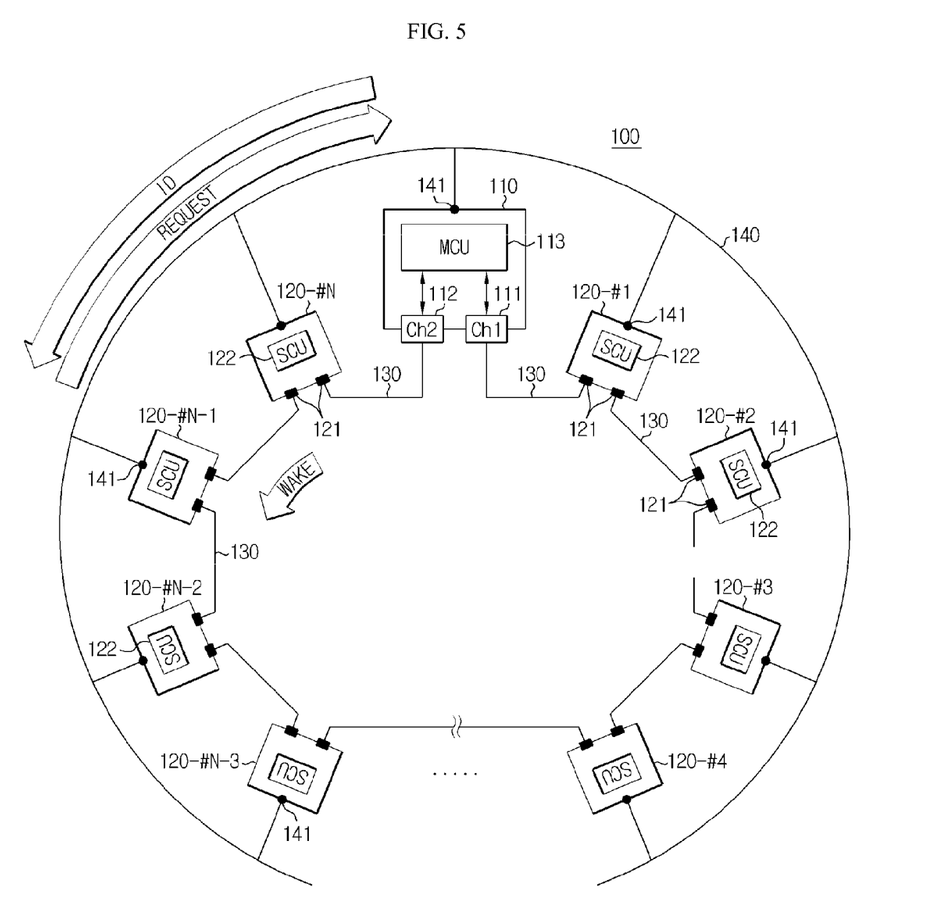
FIG. 5 is a schematic diagram illustrating a procedure in which an N−$1^{th}$ slave BMS is allocated with a unique communication identifier.

FIG. 5 is a schematic diagram illustrating a procedure in which the N-$1^{th}$ slave BMS 120-#N-1 is allocated with a unique communication identifier.

Referring to FIG. 5, the N-$1^{th}$ slave BMS 120-#N-1 receives the wake-up signal from the $N^{th}$ slave BMS 120-#N through the serial communication network 130. A subsequent procedure after the reception of the wake-up signal, that is, a process of awakening the N-$1^{th}$ slave BMS 120-#N-1 and allocating a unique communication identifier to the N-$1^{th}$ slave BMS 120-#N-1, is performed as described in the foregoing. When this process is repeated, each slave BMS installed along the transmission direction of the backward wake-up signal wakes up in a sequential order and is allocated with a unique communication identifier from the master BMS 110. Accordingly, the third slave BMS 120-#3 that failed to receive the forward wake-up signal due to an error in the serial communication network 140 wakes up and is allocated with a unique communication identifier.

As described in the foregoing, the present disclosure addresses the issue of some slave BMSs 120 failing to wake up and be allocated with a unique communication identifier due to an error in the serial communication network 140, and to overcome the problem, uses the serial communication network 130 of a ring structure and a diversified transmission direction (forward direction and backward direction) of the wake-up signal.

Figure 6:
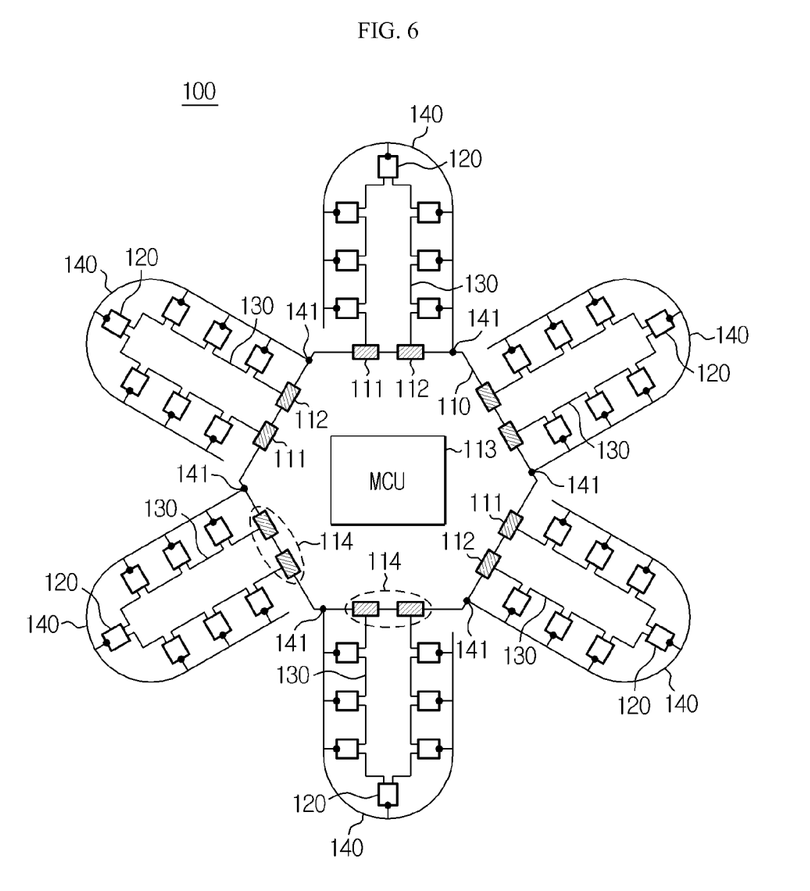
FIG. 6 is a schematic block diagram illustrating a configuration of a system for allocating an identifier to a multi-BMS according to another exemplary embodiment.

FIG. 6 is a schematic block diagram illustrating a configuration of the system 100 for allocating an identifier to a multi-BMS according to another exemplary embodiment.

As shown in FIG. 6, the master BMS 110 of the system 100 for allocating an identifier to a multi-BMS according to the present disclosure includes, but is not limited to, a single pair of master communication channel 114 and one parallel communication channel 141.

That is, the master BMS 110 may include a plurality of pairs 114 of first and second master communication channels and a plurality of parallel communication channels 141, based on a charge/discharge capacity required to the battery pack, a connection length of the communication network, performance of the master control unit 113, and the like. In this case, the first slave BMS 120-#1 through the $N^{th}$ slave BMS 120-#N may be connected in a ring structure to each master communication channel pair 114 through the serial communication network 130, and the master control unit 113 may control the wakeup and unique communication identifier allocation operations of the slave BMSs 120 using the forward wake-up signal and the backward wake-up signal for each group of the slave BMSs 120. Although FIG. 6 shows that the slave BMSs 120 are connected in a ring structure to all the master communication channel pairs 114, it is obvious that the connection of the slave BMSs 120 to some master communication channel pairs 114 may be omitted, if necessary.

In the above embodiment, each of the first slave BMS 120-#1 through the $N^{th}$ slave BMS 120-#N may control a charge/discharge operation of at least one battery cell in charge, however the battery cell being controlled by each slave BMS 120 is not illustrated in FIGS. 1 through 6. Also, the slave BMS 120 may execute various control logics applicable at the level of a person having an ordinary skill in the art, including charge/discharge control of the battery cell, equalization control, switching, measurement and monitoring of values of electrical characteristics, error indication, ON/OFF control, SOC estimation, and the like.

To execute various control logics described in the foregoing, the master control unit 113 and the slave control unit 122 may include a processor, an application-specific integrated circuit (ASIC), other chipsets, a logic circuit, a register, a communication modem, and a data processing device, known in the art pertaining to the present disclosure. Also, when the exemplary control logics are implemented as software, the master control unit 113 may be implemented as an assembly of program modules. In this instance, the program module may be stored in a memory and executed by a processor. Here, the memory may be inside or outside the processor and connected to the processor by various well-known means. The memory collectively refers to a device used to store information regardless of a device type, and is not limited to a specific memory device.

The system 100 for allocating an identifier to a multi-BMS according to the present disclosure may be an element or component of a battery pack including a plurality of battery cells. That is, a plurality of battery cells may be classified into N groups, and each cell group may be connected to the N slave BMSs 120 in a one-to-one relationship. It is obvious that the battery cells may be connected in series and/or in parallel within each cell group. Also, it is obvious that a concept of the battery pack may be expanded to include an assembly of various grouped battery units as well as an assembly of battery cells.

Also, the system 100 for allocating an identifier to a multi-BMS according to the present disclosure may be an element or component of an energy storage system to which at least one battery pack is connected in series or in parallel. Here, the energy storage system may be electrically coupled to an electrical network grid to store excess power or electric power generated from new renewable energy, and may supply power to an electric power system to improve frequency stability of the electric power system or economical efficiency of the usage of electric power.

Also, the system 100 for allocating an identifier to a multi-BMS according to the present disclosure may be an element or component of a battery-powered system including a load to which electric power from the battery pack is supplied.

The battery-powered system may include, for example, an electric vehicle (EV), a a hybrid electric vehicle (HEV), an electric bike (E-Bike), a power tool, an energy storage system, an uninterruptible power supply (UPS), a portable computer, a portable phone, a portable audio device, a portable video device, and the like. The load may be, for example, a motor to provide a torque by power supplied from a battery, or a power conversion circuit to convert power supplied from a battery into power required by various types of circuit components.

Hereinafter, a method of allocating an identifier to a multi-BMS corresponding to an operation mechanism of the above-mentioned system will be described. However, a repeated description of the master BMS 110, the slave BMS 120, the serial communication network 130, and the parallel communication network 140, the wake-up signal, and the identifier allocation request signal of the system 100 for allocating an identifier to a multi-BMS described in the foregoing is omitted herein.

Figure 7:
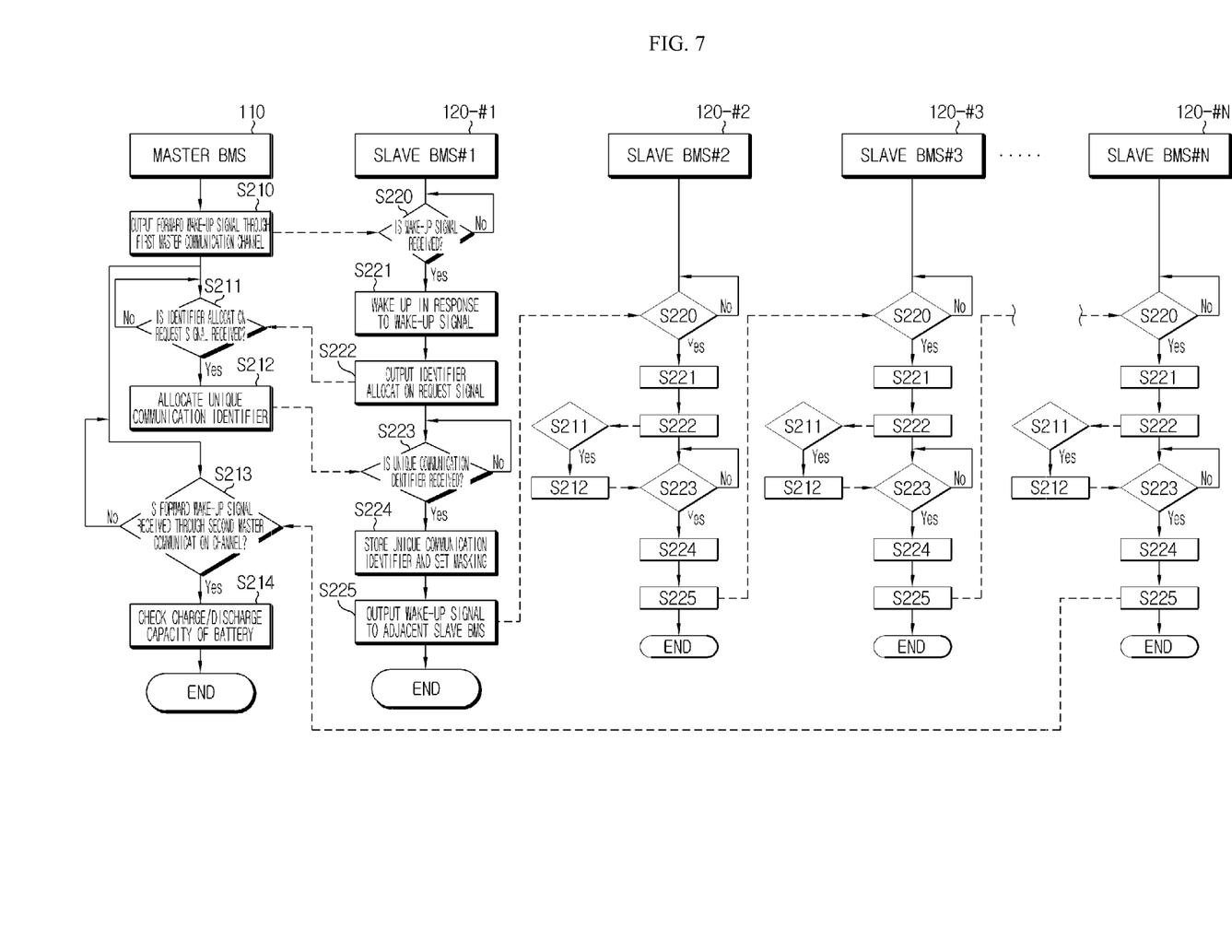
FIG. 7 is a flowchart illustrating a method of allocating an identifier to a multi-BMS according to an exemplary embodiment.

FIG. 7 is a flowchart illustrating a method of allocating an identifier to a multi-BMS according to an exemplary embodiment.

Referring to FIG. 7, first, in S210, the master BMS 110 outputs a forward wake-up signal through the first master communication channel 111. The master BMS 110 proceeds to S211 to monitor whether an identifier allocation request signal is received through the parallel communication network. At the same time, the master BMS 110 proceeds to S213 to monitor whether the forward wake-up signal is received through the second master communication channel 112.

Meanwhile, the first slave BMS 120-#1 in a sleep mode monitors whether a forward or backward wake-up signal is received (S220). When the first slave BMS 120-#1 receives the forward wake-up signal from the master BMS 110 (YES in S220), the first slave BMS 120-#1 wakes up in response to the wake-up signal (S221). Next, in S222, the first slave BMS 120-#1 outputs an identifier allocation request signal to the master BMS 110 through the parallel communication network.

When the master BMS 110 receives the identifier allocation request signal through the parallel communication network (YES in S211), the master BMS 110 allocates a unique communication identifier through the parallel communication network.

When the first slave BMS 120-#1 receives the unique communication identifier through the parallel communication network (YES in S223), the first slave BMS 120-#1 stores the unique communication identifier (S224). Preferably, the first slave BMS 120-#1 performs masking setting to avoid being further allocated with a unique communication identifier.

In S225, the first slave BMS 120-#1 outputs the wake-up signal to the adjacent second slave BMS 120-#2 along the transmission direction of the forward wake-up signal.

When the second slave BMS 120-#2 receives the wake-up signal from the first slave BMS 120-#1, the second slave BMS 120-#2 performs S220 through S225 substantially in the same manner as described in the foregoing. Similarly, when the third slave BMS 120-#3 through the $N^{th}$ slave BMS 120-#N receive the wake-up signal from the previously awakened slave BMS 120, the third slave BMS 120-#3 through the $N^{th}$ slave BMS 120-#N wake up and receive a unique communication identifier allocated from the master BMS 110 through the parallel communication network. After the last $N^{th}$ slave BMS 120-#N is allocated with the unique communication identifier, the $N^{th}$ slave BMS 120-#N outputs the wake-up signal to the master BMS 110.

The master BMS 110 receives the wake-up signal from the $N^{th}$ slave BMS 120 through the second master communication channel 112 (YES in S213). By receiving the wake-up signal through the second master communication channel 112, the master BMS 110 may verify that the serial communication network is all connected without an error or disconnection and the slave BMSs 120 are all awakened and allocated with the unique communication identifiers.

Preferably, the master BMS 110 may verify a number of the slave BMSs 120 allocated with the identifiers and a charge/discharge capacity of the battery pack, using data on a number of the unique communication identifiers allocated to the slave BMSs 120 (S214).

Figure 8:
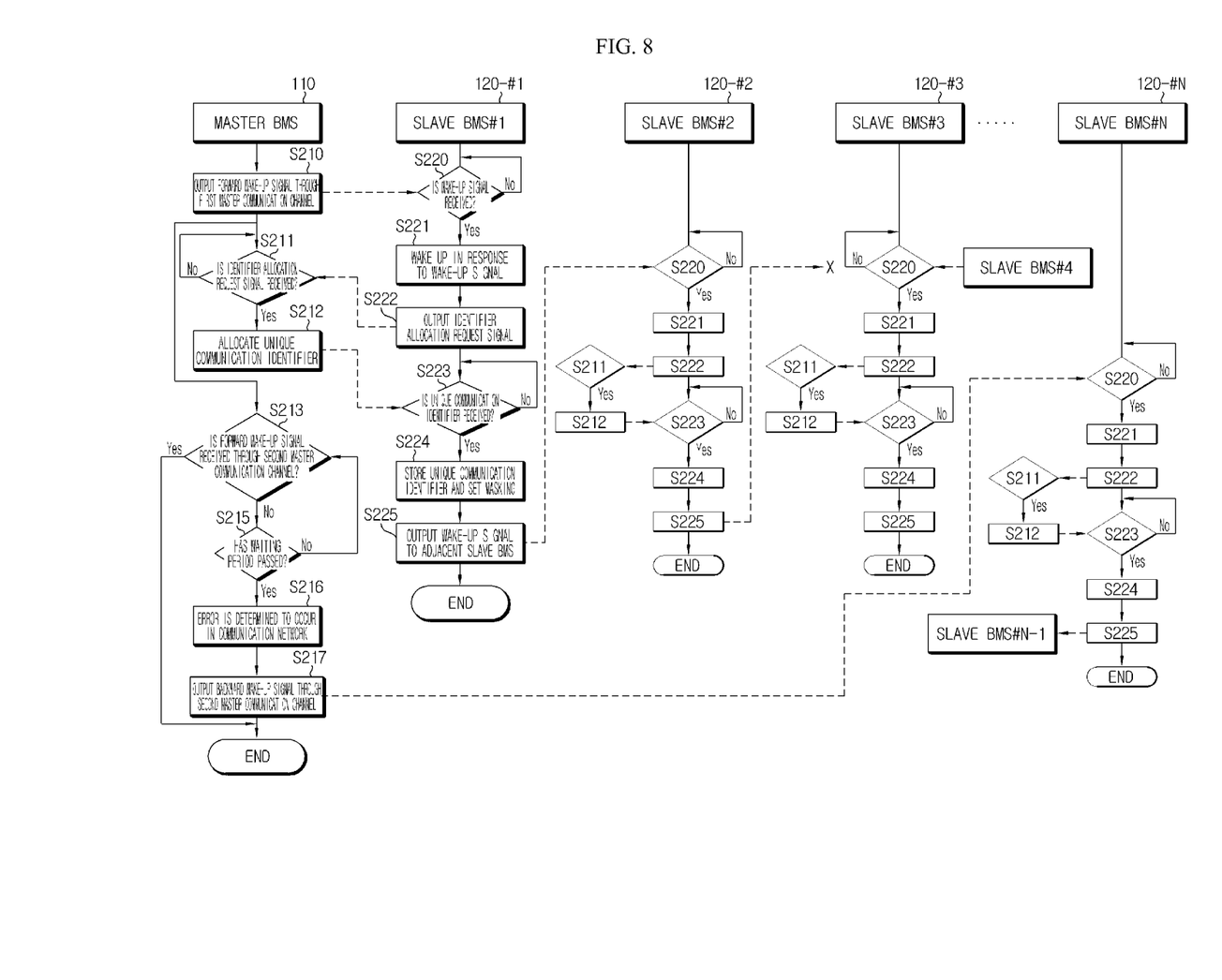
FIG. 8 is a flowchart illustrating a method of allocating an identifier to a multi-BMS according to an exemplary embodiment in a case in which an error occurs in a serial communication network.

FIG. 8 is a flowchart illustrating a method of allocating an identifier to a multi-BMS according to an exemplary embodiment in a case in which an error occurs in a serial communication network.

Referring to FIG. 8, the master BMS 110, the first slave BMS 120-#1, and the second slave BMS 120-#2 equally perform S210 through S225 described in the foregoing. However, because the serial communication network between the second slave BMS 120-#2 and the third slave BMS 120-#3 is disconnected, the third slave BMS 120-#3 cannot receive a forward wake-up signal from the second slave BMS 120-#2.

Meanwhile, after the master BMS 110 outputs a wake-up signal through the first master communication channel 111, the master BMS 110 monitors whether the wake-up signal is received through the second master communication channel 112 (S213). When the wake-up signal is received through the second master communication channel 112, it is determined that all the slave BMSs 120 are awakened, and the process ends (YES in S213).

However, when the wake-up signal is not received through the second master communication channel 112 (NO in S213), it is verified whether a preset waiting period has passed (S215). If the waiting period has passed (YES in S215), it is determined that an error occurs in the serial communication network (S216).

Next, the master BMS 110 outputs a backward wake-up signal to the $N^{th}$ slave BMS 120-#N through the second master communication channel 112 (S217). When the $N^{th}$ slave BMS 120-#N receives the backward wake-up signal, the $N^{th}$ slave BMS 120-#N wakes up in response to the backward wake-up signal and is allocated with a unique communication identifier from the master BMS 110 through the parallel communication network (S220 through S225). After each of the slave BMSs 120-#1, . . . , 120-#3 installed along the transmission direction of the backward wake-up signal receives the backward wake-up signal from the adjacent slave BMS, each slave BMS 120-#1, . . . , 120-#3 wakes up and is allocated with a unique communication identifier from the master BMS 110. And, after the fourth slave BMS 120-#4 is allocated with a unique communication identifier, the fourth slave BMS 120-#4 outputs the wake-up signal to the last third slave BMS 120-#3. Accordingly, the third slave BMS 120-#3 that failed to receive the wake-up signal due to the disconnection of the communication network wakes up and can be allocated with a unique communication identifier from the master BMS 110. As a result, all the slave BMSs 120 are awakened and allocated with unique communication identifiers.

According to the present disclosure, in a case in which an error occurs in the serial communication network, this may be automatically detected, and all the slave BMSs may be awakened and allocated with unique communication identifiers by diversifying the transmission direction of the wake-up signal. Accordingly, a conventional problem of being incapable of allocating an identifier to a BMS connected after a faulty section of the serial communication network may be solved.

Also, even in a case in which an error occurs in a certain section of the serial communication network, the need to remove or replace the faulty section of the communication network and a slave BMS corresponding to the faulty section may be eliminated, resulting in ease of maintenance and repair of the battery system and reduction in maintenance and repair costs. Further, an identifier may be allocated to a multi-BMS in a sequential order by allowing for the use of both the parallel communication network and the serial communication network, thereby preventing a possible overlap between identifiers. Accordingly, even though a certain BMS among the multi-BMS is replaced by a new one or a new BMS allocated with an identifier is provided, operation without any overlap between identifiers may be implemented, thereby enhancing expansion or adaptation in installation for the BMS and improving reliability of the battery pack.

Also, there is an advantage of being free to arrange the master BMS and the slave BMS when implementing the battery pack since the master BMS does not need to be placed at a foremost or backmost end of the serial communication network.

Meanwhile, in the description of the present disclosure, it should be understood that each element or component of the system 100 for allocating an identifier to a multi-BMS shown in FIGS. 1 through 6 is distinguished logically rather than physically.

That is, each element or component corresponds to a logic element or component to realize the technical spirit of the present disclosure, and accordingly, it should be understood that even though each element or component is integrated or separated, it falls within the scope of the present disclosure if a function performed by a logic element or component of the present disclosure can be implemented, and it falls within the scope of the present disclosure regardless of whether names are identical or not if it is an element or component performing an identical or similar function.

The present disclosure has been described in detail. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

What is claimed is:

1. A system for allocating an identifier to a multi-battery management system (BMS) that allocates a unique communication identifier to a multi-BMS of a battery pack, the system comprising a master BMS and N slave BMSs (N is an integer greater than or equal to 2) connected to a serial communication network and a parallel communication network, wherein the master BMS includes at least two first and second master communication channels that form a communication interface with the serial communication network and selectively output a forward or backward wake-up signal, and allocates a unique communication identifier to the slave BMS through the parallel communication network, and the first through $N^{th}$ slave BMSs wake up in response to the forward or backward wake-up signal received through the series communication network, are allocated with the identifier from the master BMS through the parallel communication network, and output the wake-up signal to the adjacent slave BMS along the transmission direction of the wake-up signal.

2. The system according to claim 1, wherein the master BMS and the N slave BMSs are connected in a ring structure through the serial communication network.

3. The system according to claim 1, wherein the master BMS outputs a forward wake-up signal through the first master communication channel and a backward wake-up signal through the second master communication channel.

4. The system according to claim 3, wherein the master BMS includes a master control unit to control the output of the forward or backward wake-up signal.

5. The system according to claim 1, wherein the slave BMS includes at least two slave communication channels forming a communication interface with the serial communication network.

6. The system according to claim 1, wherein the slave BMS includes a slave control unit to sense the forward or backward wake-up signal being received through the serial communication network and control the wake up of the BMS, and to control the output of an identifier allocation request signal to the master BMS through the parallel communication network.

7. The system according to claim 6, wherein the slave control unit includes a masking setting logic to perform masking setting to prevent a unique communication identifier from being further allocated after the unique communication identifier is allocated from the master BMS.

8. The system according to claim 6, wherein the slave control unit includes a wake-up signal transmission logic to control the transmission operation of the wake-up signal to the adjacent slave BMS along the transmission direction of the forward or backward wake-up signal through the serial communication network after the unique communication identifier is allocated from the master BMS.

9. The system according to claim 4, wherein the master control unit includes a capacity check control logic to check a number of the slave BMSs allocated with the unique communication identifiers and a charge/discharge capacity of the battery pack using data on a number of the unique communication identifiers allocated to the slave BMSs.

10. The system according to claim 4, wherein the master control unit includes an error determination control logic to determine that an error occurs in the serial communication network when the wake-up signal is not received within a preset period of time through the second master communication channel after the forward wake-up signal is outputted through the first master communication channel.

11. The system according to claim 10, wherein the master control unit outputs a backward wake-up signal through the second master communication channel when an error is determined to occur in the serial communication network.

12. The system according to claim 1, wherein the parallel communication network is a controller area network (CAN) communication network.

13. The system according to claim 1, wherein the serial communication network is a daisy chain.

14. The system according to claim 1, wherein the master BMS includes a plurality of pairs of first and second master communication channels to output a wake-up signal.

15. The system according to claim 14, wherein the first through $N^{th}$ slave BMSs are connected in a ring structure to each pair of the master communication channels through the serial communication network.

16. A battery pack comprising a system for allocating an identifier to a multi-BMS according to claim 1.

17. A battery-powered system comprising:
a battery pack according to claim 16; and
a load supplied with power from the battery pack.

18. The battery-powered system according to claim 17, wherein the load is an electric motor means or a portable equipment.

19. An energy storage system comprising a plurality of battery packs according to claim 16.

20. A method of allocating an identifier to a multi-BMS that allocates a unique communication identifier to a multi-BMS of a battery pack in which a master BMS and N slave BMSs (N is an integer greater than or equal to 2) are connected through a serial communication network and a parallel communication network, and the master BMS includes first and second master communication channels to selectively output a forward or backward wake-up signal through the serial communication network, the method comprising:
(a) selecting, by the master BMS, any one of the first master communication channel and the second master communication channel based on a normal mode and an error mode, and outputting a wake-up signal through the series communication network in a direction corresponding to the selected communication channel; and
(b) the slave BMS waking up in response to the forward or backward wake-up signal, receiving a unique communication identifier allocated from the master BMS through the parallel communication network, and outputting the wake-up signal to the adjacent slave BMS through the serial communication network along the transmission direction of the forward or backward wake-up signal.

21. The method according to claim 20, wherein the master BMS and the N slave BMSs are connected in a ring structure through the serial communication network.

22. The method according to claim 20, wherein the step (b) comprises the slave BMS waking up in response to the wake-up signal and outputting an identifier allocation request signal to the master BMS through the parallel communication network.

23. The method according to claim 22, wherein the step (b) comprises the slave BMS performing masking setting to prevent a unique communication identifier from being further allocated after the unique communication identifier is allocated from the master BMS.

24. The method according to claim 20, wherein the step (a) comprises the master BMS determining that an error occurs in the serial communication network when the master BMS fails to receive the wake-up signal within a preset period of time through the second master communication channel after the master BMS outputs the forward wake-up signal through the first master communication channel.

25. The method according to claim 24, wherein the step (a) comprises the master BMS outputting a backward wake-up signal through the second master communication channel when the master BMS determines that an error occurs in the serial communication network.

26. The method according to claim 20, further comprising:
the master BMS checking a number of the slave BMSs allocated with the unique communication identifier and a charge/discharge capacity of the battery pack using data on a number of the unique communication identifiers allocated to the slave BMSs.

* * * * *